United States Patent [19]

Hobson, Jr. et al.

[11] 4,110,808
[45] Aug. 29, 1978

[54] GROUND FAULT PROTECTION SYSTEM FOR MULTIPLE SOURCE DISTRIBUTION NETWORKS

[75] Inventors: Charles F. Hobson, Jr., Southington; John D. Hamilton, Farmington, both of Conn.

[73] Assignee: General Electric Company, New York, N.Y.

[21] Appl. No.: 830,265

[22] Filed: Sep. 2, 1977

[51] Int. Cl.² .............................................. H02H 3/28
[52] U.S. Cl. ......................................... 361/44; 361/48; 361/64; 361/87
[58] Field of Search ...................... 361/44, 47, 48, 63, 361/64, 87, 42, 78

[56] References Cited

U.S. PATENT DOCUMENTS

3,259,802  7/1966  Steen .......................................... 361/48
3,675,080  7/1972  Bath ...................................... 361/87 X
3,949,272  4/1976  Smith ....................................... 361/48
4,068,275  1/1978  Teel et al. ............................... 361/44

Primary Examiner—Patrick R. Salce
Attorney, Agent, or Firm—Robert A. Cahill; Walter C. Bernkopf; Frank L. Neuhauser

[57] ABSTRACT

Various embodiments of a ground fault protection system are disclosed for protecting a multiple source distribution network consisting of at least two sources having their neutral points interconnected by main neutral and tie neutral bus and also typically by separate ground connections. The system operates to selectively trip a ground fault circuit interrupter by distinguishing between normal neutral loading regardless of the routes taken by neutral currents in returning to the sources and a ground fault regardless of the routes taken by ground fault currents in returning to the source feeding the fault.

11 Claims, 6 Drawing Figures

GROUND FAULT PROTECTION SYSTEM FOR MULTIPLE SOURCE DISTRIBUTION NETWORKS

BACKGROUND OF THE INVENTION

Modern circuit protection for a single-ended (single source) three-phase, four-wire power distribution network is provided by static trip circuit interrupters, such as circuit breakers, equipped with three current transformers for separately sensing the phase currents flowing in each phase conductor. The current outputs of these transformers are separately applied to a static trip unit for processing to determine the existence of an overcurrent condition. If an overcurrent condition is found to exist, an overcurrent trip function is initiated leading to interruption of the phase conductors. If, in addition to overcurrent protection, ground fault protection is also desired, the phase current sensing transformer outputs are also individually applied, together with the current output of a neutral current sensing transformer, to some type of current differential or residual circuit. Should an overall imbalance in the currents flowing in the phase and neutral conductors of the network exist, as occasioned by ground fault current returning to the source via an external ground path, a ground fault signal proportional to the overall current imbalance is produced. This ground fault signal is processed by the static trip unit pursuant to initiating a ground fault trip function likewise leading to the opening of interrupter contacts and consequent interruption of at least the phase conductors. Static circuit interrupter trip units capable of affording integral overcurrent and ground fault protection are disclosed in U.S. Pat. No. 3,786,311 and commonly assigned, co-pending application Ser. No. 794,700, filed May 6, 1977.

For ground fault protection of double-ended (two sources) power distribution networks, the typical industry practice is to resort to separate zero sequence transformers for sensing current imbalances in the main phase and neutral conductors or buses for each source and in the interconnecting or tie phase and neutral buses. The signal outputs of these transformers are applied to separate ground fault relays operating to selectively shunt trip associated main and tie circuit interrupters pursuant to removing the faulted bus from the network, while continuing network power distribution via the remaining unfaulted bus. Examples of systems of this type for protecting multiple source distribution networks from ground faults are disclosed in U.S. Pat. Nos. 3,259,802, 3,558,981 and 3,949,272.

It is a principal object of the present invention to provide a ground fault protection system for multiple source power distribution networks which utilizes one or more circuit interrupters having static trip units operable to execute a ground fault trip function.

A further object is to provide a ground fault protection system of the above character which is constructed to distinguish between normal neutral loading, wherein the neutral currents take diverse return paths, and a ground fault condition.

An additional object is to provide a ground fault protection system of the above character which is capable of recognizing the full extent of a ground fault condition even though ground leakage current may return to the source feeding the fault via neutral conductors of the distribution network.

Yet another object of the present invention is to provide a ground fault protection system of the above character wherein the circuit interrupters are selectively tripped to remove the ground faulted bus from the network while continuing electrical service over the remaining unfaulted bus.

An additional object of the present invention is to provide a ground fault protection system of the above character which is inexpensive to implement and reliable in operation.

Other objects of the invention will in part be obvious and in part appear hereinafter.

SUMMARY OF THE INVENTION

In accordance with the present invention, there is provided a system for protecting a multi-source, three-phase, four-wire power distribution network against ground faults. Each source feeds its own main bus and, optionally, other main buses via one or more tie buses. The neutral points of the sources are interconnected by main and tie neutral buses and also by separate grounding connections. Separate circuit interrupters are installed to interrupt the respective main buses. At least one of the main bus circuit interrupters is integrally equipped with separate current transformers for sensing the currents flowing in its associated three phase buses and neutral bus. These current transformers supply current outputs to a current differential or residual circuit included in a trip unit for the one main interrupter. In response to a current imbalance, the current differential circuit develops a ground fault signal; which signal is processed by the trip unit pursuant to initiating a ground fault trip function resulting in interruption of the associated main phase buses.

In one embodiment of the invention, the other main interrupter and a tie interrupter are identically equipped to afford integral ground fault protection. To insure that the system remains non-responsive to normal neutral loading regardless of the possibly diverse neutral bus paths taken by the neutral return current and yet responsive to ground fault current regardless of its return path to the source feeding the fault, the neutral current transformer secondary windings, in addition to being connected to their associated current differential circuits, are interconnected with each other in a loop circuit. Moreover, each circuit interrupter is equipped with auxiliary contacts which close to complete the circuit between its neutral current transformer secondary winding and associated current differential circuit only while the interrupter contacts are closed. With this construction, as long as one circuit interrupter remains open, any neutral current returning to one of the sources via the main neutral bus of the other source and the neutral point grounding interconnection, is accounted for via the induced currents circulating in the loop circuit; such currents being automatically routed through appropriate ones of the differential circuits such as to maintain an overall current balance therein. Consequently, nuisance tripping under all neutral loading conditions is avoided.

On the other hand, by virtue of the loop circuit interconnection of the neutral current transformers the full measure of ground fault is recognized at least in the trip unit of the main breaker associated with the source feeding the fault, even though some of the ground fault current may return to this source via the neutral grounding interconnection and network neutral buses. Currents induced in the loop circuit by ground fault current flowing in the network neutral buses are constrained from circulating through those of the differential circuits receiving current inputs occasioned by phase currents feeding the ground fault, thus preventing any mitigation of the current imbalances.

The system of the present invention may be expanded to provide ground fault protection for a distribution network having any number of sources feeding power to associated main bus and interconnecting tie bus. In a specifically disclosed embodiment, the system is adapted to protect a network consisting of three sources using three main interrupters and two tie interrupters equipped and controllably interconnected in the manner generally described above.

In some double-ended installations, the tie interrupter need not be equipped to execute a ground fault trip function. To adapt the system of the present invention to this type of installation, the tie interrupter is simply equipped with a single current transformer for sensing current flow in the neutral tie bus. In addition to the auxiliary switch contacts operating in the circuit between its neutral current transformer and current differential circuit, each main circuit interrupter is equipped with a second set of auxiliary contacts selectively operating to route current circulating in the loop circuit around the tie neutral current transformer secondary winding pursuant to enabling the system to distinguish between normal neutral loading and a ground fault condition.

In still another embodiment, the system of the present invention is adapted to ground fault protect a load transfer installation, where a single load is powered from either one of the two sources, such as a normal utility source and a standby or emergency source. Requisite ground fault tripping and normal neutral loading recognition are achieved using a ground fault trip circuit interrupter in one or both of the main phase buses.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

Like reference numerals refer to corresponding parts throughout the several views of the drawings.

DETAILED DESCRIPTION

Figure 1:
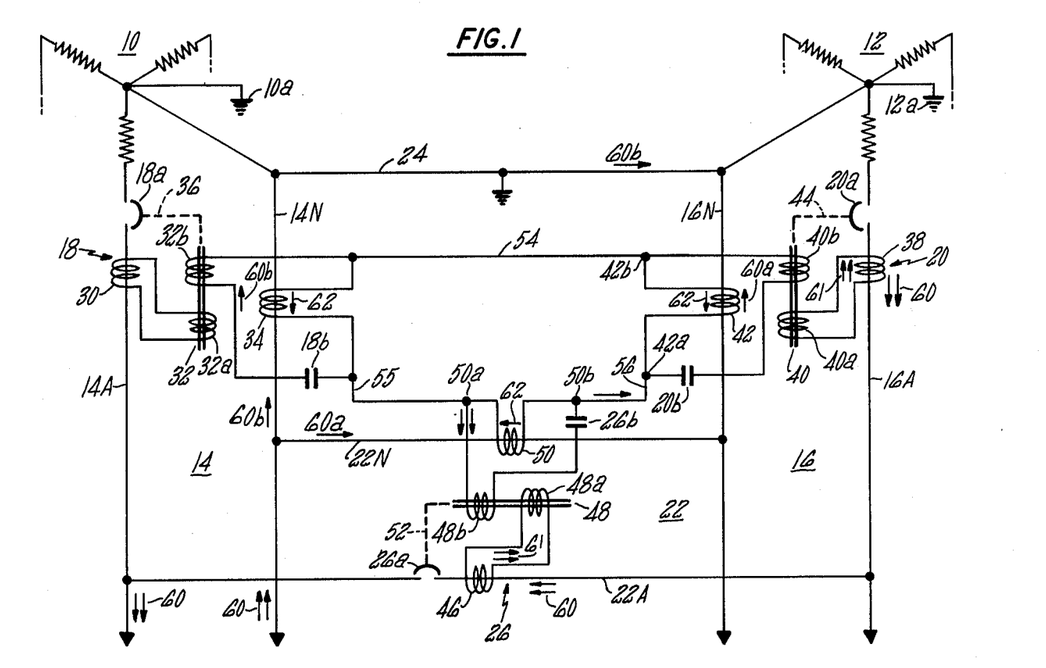
FIG. 1 is a simplified circuit diagram of one embodiment of a ground fault protection system constructed in accordance with the present invention for implementation in a double-ended power distribution network.

Referring to FIG. 1, there is illustrated a double-ended power distribution network comprising two separate power sources 10 and 12 feeding main bus 14 and 16 through main circuit interrupters, such as circuit breakers 18 and 20, respectively. Downstream of the main circuit breakers, the main buses 14 and 16 are interconnected by a tie bus 22. The distribution network is a three-phase, four-wire network; however, for the sake of simplicity, only one phase bus plus the neutral bus are illustrated in FIG. 1 for the main buses 14, 16 and the tie bus 22. The sources 10 and 12 are shown as each comprising a transformer secondary having three-phase windings connected in wye configuration with their neutral points solidly grounded at 10a and 12a, respectively. The neutral point of source 10 is also brought out for solid connection to the neutral bus 14N of main bus 14, while the neutral point of source 12 is brought out for solid connection to the neutral bus 16N of its main bus 16. As is common practice, the neutral buses 14N and 16N are connected to a common grounded bus 24 at points adjacent the sources 10 and 12. Downstream of the main circuit breakers 18 and 20, the main neutral buses 14N and 16N are interconnected by a tie neutral bus 22N of tie bus 22.

Main circuit breaker 18 includes separate sets of contacts operating to connect each of the three phases of source 10 to the individual phase buses of main bus 14. Thus, as illustrated in FIG. 1, main breaker contacts 18a operate to connect one of the phases of source 10 to phase bus 14A. It will be appreciated that additional sets of contacts in main breaker 18 connect the other two phases of source 10 to the other two phase buses of main bus 14. Similarly, main breaker 20 includes separate sets of contacts for connecting the three phases of source 12 to the three phase buses of main bus 16. As specifically illustrated in FIG. 1, breaker contacts 16a operate to connect one phase of source 12 to phase bus 16A of main bus 16.

Included in tie bus 22 is a tie circuit breaker, generally indicated at 26, which includes separate sets of contacts operating in each tie phase bus interconnecting the corresponding phase buses of the main bus 14 and 16. Thus, as illustrated in FIG. 1, tie circuit breaker 26 includes a set of contacts 26a operating in tie phase bus 22A interconnecting main phase buses 14A and 16A.

Each of the main circuit breakers 18 and 20, as well as the tie circuit breaker 26, is equipped in conventional fashion with four current transformers for sensing the current flowing in its associated phase and neutral buses. These current transformers develop current signals representative of the currents flowing in the phase and neutral buses for separate application to individual primary windings of a differential current transformer functioning as a current differential or residual circuit. Should an imbalance exist in the currents flowing in the primary windings of the differential transformer, a ground fault current signal is induced in its secondary for application to signal processing circuitry included in a static trip unit pursuant to initiating a ground fault trip function resulting in the opening of the breaker contacts. In FIG. 1 only one of the phase current sensing current transformers is depicted for each of the main and tie circuit breakers for simplicity sake. Thus, main circuit breaker 18 is illustrated as including a current transformer 30 inductively coupled with phase bus 14A of main bus 14. The secondary of this current transformer is connected to drive primary winding 32a of a differential current transformer 32. Similarly, a current transformer 34 inductively coupled with neutral bus 14N of main bus 14 is connectable through normally open circuit breaker auxiliary contacts 18b to drive a separate primary winding 32b of differential current transformer 32. The secondary winding of differential current transformer 32, together with the static trip unit for processing ground fault signals incident to initiating a ground fault trip function are symbolically represented by the dashed line 36. It will be appreciated that, in practice, the phase current sensing current transformers may also apply their current signals to overcurrent signal processing circuitry included in the trip unit pursuant to executing an overcurrent trip function. With the exception of circuit breaker auxiliary contacts 18b, the above-described construction of main circuit breaker 18 seen in FIG. 1 is conventional.

Main circuit breaker 20 is, as seen in FIG. 1, of the same construction as main circuit breaker 18. Thus, phase current transformer 38 is connected to drive one primary winding 40a of a differential current transformer 40, while neutral current transformer 42 is connectable through circuit breaker auxiliary contacts 20b to drive a separate primary winding 40b of differential current transformer 40. Any imbalance in the primary currents of differential current transformer 40 signals the initiation of a ground fault trip function leading to the opening of the breaker contacts 20a, as symbolically represented at 44.

Tie circuit breaker 26 likewise includes, as illustrated in FIG. 1, a phase current transformer 46 connected to drive primary winding 48a of differential current transformer 48. A neutral current transformer 50 is connectable through circuit breaker auxiliary contacts 26b to drive a separate differential current transformer primary winding 48b. Should an imbalance exist in the primary currents, the differential current transformer 40 develops a ground fault signal in its secondary winding which is processed by trip unit circuitry pursuant to initiating a ground fault trip function as represented symbolically by the dashed line 52.

In accordance with the present invention, to assure that a ground fault trip function is not initiated in any of the circuit breakers 18, 20 and 26 in response to normal neutral loading of the distribution network and yet is correctly initiated in response to a valid ground fault condition, the upper terminals of neutral current transformer 34 in circuit breaker 18 and neutral current transformer 42 in circuit breaker 20 are connected together by a lead 54. The lower end of neutral current transformer 34 is connected to the left end of neutral current transformer 50 in tie circuit breaker 26 via a lead 55, while the lower end of neutral current transformer 42 is connected to the right end of neutral current transformer 50 via a lead 56. It is thus seen that the neutral current transformers of the two main circuit breakers and the tie circuit breaker are connected in a circuit loop.

To appreciate the operation of the ground fault protection system embodiment of the invention seen in FIG. 1, it must be understood that a) for significant current to flow in a given transformer secondary winding, there must be a corresponding current flow in its primary, and b) Kirchhoff's first law must be satisfied at each junction point (i.e., the algebraic sum of all instantaneous currents at each such junction must equal zero). In addition, in order for the ground fault protection system of the invention to operate properly, only two of the three circuit breakers 18, 20 and 26 in FIG. 1 can be closed at any one time.

To demonstrate that the embodiment of the invention seen in FIG. 1 functions properly in response to normal neutral loading, assume that circuit breaker 18 is open, while main breaker 20 and tie breaker 26 are closed enabling source 12 to supply current via main bus 16 and tie bus 22 to a load (not shown) connected between phase bus 14A and neutral 14N of main bus 14 downstream from tie bus 22. Breaker auxiliary contacts 18b are open, while breaker auxiliary contacts 20b and 26b are closed. It is readily seen that if all of the phase current flowing from source 12 to the load via main phase bus 16A, tie phase bus 22A and main phase bus 14A returns to source 12 via main neutral bus 14N, tie neutral bus 22N and main neutral bus 16N, the differential current transformers in tie breaker 26 and in main breaker 20 remain balanced. That is, the currents induced in their respective phase and neutral transformers drive their associated differential current transformer primary windings equally and in opposite directions, with the result that there is no residual flux flowing in the transformer cores to induce ground fault signals in their secondary windings. Consequently neither circuit breaker trips when faced with this particular normal neutral loading condition.

It is however rather common under normal neutral loading conditions for the neutral return current on neutral bus 14N to split at its junction with tie neutral bus 22N, such that some of the neutral current returns to source 12 via tie neutral bus 22N and main neutral bus 16N, as before, and the remainder returns via main neutral bus 14N and ground bus 24. Under these circumstances, it would seem that, since the currents flowing in the phase and neutral buses of tie bus 22 and main bus 16 are unequal, the differential current transformers 48 and 40 of tie breaker 26 and main breaker 20, respectively, should detect an imbalance and thus operate to initiate an uncalled for ground fault trip function. As will be demonstrated, by virtue of the connection of the neutral current transformers in loop circuit in accordance with the present invention, all of the neutral return current is automatically attributed to the appropriate differential current transformers in a manner to assure their balanced conditions and thus preclude the initiation of an improper ground fault trip function. To understand this operation, assume that source 12 is supplying two units of current, as represented by the two arrows 60, to a load connected between phase bus 14A and neutral bus 14N of main bus 14. These two units of current flow through main phase bus 16A and tie phase bus 22A to main phase bus 14A. In returning from the load, the two units of current split at the junction of main neutral bus 14N and tie neutral bus 22N, with one unit, represented by single arrow 60a, returning to source 12 via tie neutral bus 22N and main neutral bus 16N. The other unit of neutral current, represented by single arrow 60b, returns to source 12 via main neutral bus 14N and ground bus 24. It will be assumed that current flowing in one direction in a bus conductor will induce a current flowing in the opposite direction in the current transformer secondary winding coupled therewith. Accordingly, two units of secondary current are induced in phase current transformer 38, as indicated by the double arrow 61. Similarly, two units of secondary current represented by the double arrow 61 are induced in current transformer 46. By the same token, one unit of secondary current is induced in each of the three neutral current transformers, as indicated by each single arrow 62.

It is seen that the unit of secondary current in neutral current transformer 34 cannot flow into the relatively low impedance differential current transformer winding 32b because circuit breaker auxiliary switch 18b is open, and thus this current unit is constrained to flow out into the neutral current transformer circuit loop via lead 55 toward junction 50a of neutral current transformer 50 with its differential current transformer winding 48b. It will be noted that also flowing into this junction is the unit of secondary current induced in neutral current transformer 50. Consequently, two units of secondary current must flow out of this junction to satisfy Kirchhoff's law. These two units of currents must therefore flow through differential current transformer primary winding 48b to thus counterbalance the two units of secondary current induced in phase current transformer 46 and flowing through differential current transformer primary winding 48a. At junction 50b, the two units of secondary current flowing through differential current transformer primary winding 48b split to satisfy Kirchhoff's law, with one unit flowing back through neutral current transformer 50 and the other unit flowing via lead 56 up to the junction 42a of neutral current transformer 42 with differential current transformer primary windings 40b. Also flowing into this junction is the unit of secondary current induced in neutral current transformer 42, and consequently two units of secondary current are made available for flow through differential current transformer primary winding 40b to counterbalance the two units of secondary current induced in phase current transformer 38 and flowing in differential current transformer primary winding 40a. At the other junction 42b of neutral current transformer 42 with differential current transformer primary winding 40b, the two units of secondary current split, with one flowing back through neutral current transformer 32 and the other flowing via lead 54 to neutral current transformer 34.

From the foregoing description, it is seen that the differential current transformers in tie breaker 26 and main breaker 20 remain balanced and thus do not initiate a ground fault trip function despite the fact that all of the neutral current does not return to the source via the neutral bus associated with the phase bus feeding the load.

Figure 2:
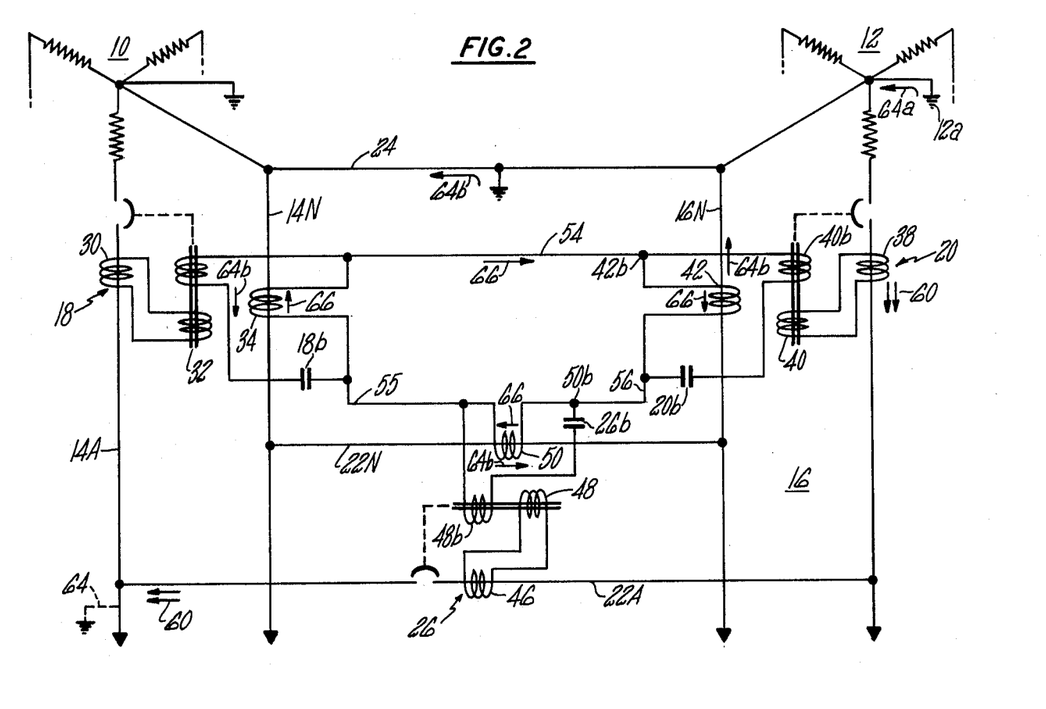
FIG. 2 is a circuit diagram of the embodiment of FIG. 1, illustrating its operation in response to a ground fault condition.

To demonstrate that the ground fault protection system of FIG. 1 functions correctly in response to a ground fault, reference is made to FIG. 2 where the circuit diagram of FIG. 1 is redrawn. Assume that main circuit breaker 18 is again open, while main breaker 20 and tie breaker 26 are closed. Consequently, circuit breaker auxiliary contacts 18b are open, while circuit breaker auxiliary contacts 20b and 26b are closed. It is assumed that the distribution network is subjected to a ground fault 64 on main phase bus 14A and that source 12 is feeding two units of current into this fault, as indicated by the double arrows 60. It is clear that if all of this ground fault current returns to source 12 via an external ground path and the neutral point grounding connection 12a both differential current transformers 48 and 40 will see an unbalance corresponding to two units of secondary current, and ground fault trip functions will be initiated in both the main and tie breakers. In practice, the tie circuit breaker will have a shorter ground fault trip delay than the main breaker, and consequently the tie breaker will trip first to clear the ground fault, leaving the main breaker closed for continued electrical service to loads supplied exclusively over main bus 16.

Instead of all of the ground fault current returning to source 12 via ground connection 12a, it is assumed that one unit (arrow 64a) returns via ground connection 12a and the other unit returns to source 12 via ground bus 24, main neutral bus 14N, tie neutral bus 22N and main neutral bus 16N, as indicated by arrow 64b. This unit of ground fault current 64b induces a unit of secondary current (arrow 66) in each of the neutral current transformers 34, 50 and 42. Since circuit breaker auxiliary contacts 18b are open, the unit of secondary current induced in neutral current transformer 34 cannot flow into its associated differential current transformer primary winding and thus is constrained to flow via lead 54 to junction 42b at the upper end of neutral current transformer 42. Since only one unit of secondary current is induced in neutral transformer 42 and its direction of flow is away from junction 42b, the only way Kirchhoff's law can be satisfied at this junction is for there to be zero current flow in differential current transformer primary winding 40b. This being the case, differential current transformer 40 sees the full imbalance of two current units created by the two units of phase current flowing through phase current transformer 38, as is appropriate.

Since the secondary current flowing in neutral current transformer 42 cannot flow into primary winding 40b, it is constrained to flow over lead 56 to junction 50b at the right end of neutral current transformer 50. Similarly, to satisfy Kirchhoff's law at this junction, all of this current must flow through neutral current transformer 50a to make up the one unit of secondary current induced therein. No current is thus available for flow through differential current transformer primary winding 48b. Consequently this differential current transformer sees a two unit secondary current imbalance, as induced in phase current transformer 46 by the two units of phase current flowing through tie phase bus 22A. Since the unit of secondary current induced in neutral current transformer 50 cannot flow through differential current transformer winding 48b, it is constrained to flow over lead 55 to neutral current transformer 34. Circuit breaker auxiliary contacts 18b being open, this secondary current unit is constrained to flow through neutral current transformer 34 to make up the unit of secondary current induced therein.

From the foregoing description, it is seen that by virtue of the loop circuit interconnection of the neutral current transformers in accordance with the present invention, any units of secondary current induced in these neutral current transformers by virtue of ground fault current returning via the neutral bus simply circulate in this circuit loop and thus do not influence the differential current transformers. Consequently, these current transformers are capable of sensing the full magnitude of ground fault current. Again, in practice, the ground fault trip delay of tie breaker 26 would typically be shorter than that of main breaker 20 and consequently the former trips first to clear ground fault 64.

While the foregoing operation of the embodiment of the present invention seen in FIGS. 1 and 2 has been demonstrated for normal neutral loading and ground fault situations with main breaker 18 open and tie breaker 26 and main breaker 20 closed, it can be demonstrated that the same correct operations are achieved with main breaker 20 open and main breaker 18 and tie breaker 26 closed, or with the two main breakers closed and the tie breaker open.

Figure 3:
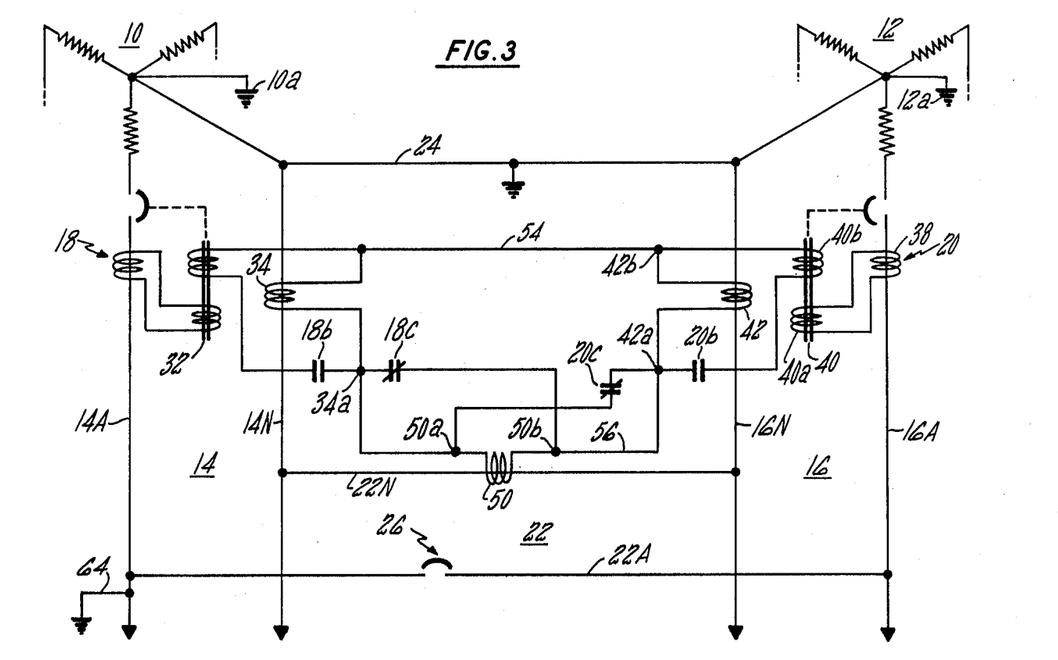
FIG. 3 is a simplified circuit diagram of an alternative embodiment of the invention for protecting a double-ended power distribution network against ground faults.

In FIG. 3 there is shown a double-ended power distribution network including sources 10 and 12, main bus 14 and 16, and interconnecting tie bus 22, as in FIGS. 1 and 2. The main circuit breakers 18 and 20 are constructed in the manner described above, however in this embodiment of the present invention the tie circuit breaker is not integrally equipped to execute a ground fault trip function. Consequently, it is devoid of a differential current transformer and the associated phase current transformer. The tie circuit breaker is however equipped with a neutral current transformer, as indicated at 50 in FIG. 3. To accommodate this installation, main circuit breaker 18 is equipped with a second set of auxiliary contacts 18c, while main circuit breaker 20 is equipped with a second set of auxiliary contacts 20c. These auxiliary contacts are normally closed contacts, such that they are closed when their associated breaker contacts are open, and vice versa. Each main breaker is equipped with normally open auxiliary contacts 18b and 20b, which are closed when their associated breaker contacts are closed, and vice versa, as in the embodiment of FIGS. 1 and 2. Breaker auxiliary contacts 18c are wired into the neutral current transformer circuit loop between the lower terminal of neutral current transformer 34 at junction 34a and the right terminal of neutral current transformer 50 at junction 50b. Breaker auxiliary contacts 20c are wired into the secondary current loop between the lower end of neutral current transformer 42 at junction 42a and the left end of neutral current transformer 50 at junction 50a. As will be seen below, this embodiment of the present invention seen in FIG. 3 functions to protect the distribution network from ground faults while properly accounting for normal neutral loading situations as long as one of the main and tie breakers is open.

To demonstrate proper operation of the system under normal neutral loading situation, assume that main breaker 18 is open and main breaker 20 is closed to route two units of phase current via main phase bus 14A and neutral bus 14N. In this situation, auxiliary contacts 18b and 18c of main breaker 18 are open and closed, respectively. Auxiliary contacts 20b and 20c of main breaker 20 are respectively closed and opened. If all of the neutral current returns to source 12 via tie neutral bus 22N and main neutral bus 16N, it is seen that two units of secondary current are induced in each of the neutral current transformers 50 and 42. Since no neutral current flows through the portion of main neutral bus 14N monitored by neutral current transformer 34, its secondary winding constitutes a high impedance in the secondary current circuit loop. The two units of secondary current induced in neutral transformer 50 simply circulate in the sub-loop completed by the closed breaker auxiliary contacts 18c. As a consequence, the only route the two units of secondary current induced in neutral current transformer 42 can take is through the closed auxiliary breaker contacts 20b and primary winding 40b of differential transformer 40, thus balancing this transformer.

If the neutral current should split with one unit returning via neutral bus 14N and ground bus 24 to source 12 and the other current unit returning via neutral bus 22N and neutral bus 16N, the unit of secondary current induced in current transformer 34 and the unit of secondary current induced in neutral current transformer 50 will combine at junction 34a to constitute two units of secondary current flowing through the closed circuit breaker auxiliary contacts 18c to junction 50b. From this junction, one unit of current will flow back through neutral current transformer 50, while the other unit will flow up to junction 42a via loop circuit lead 56 where it combines with the one unit of secondary current induced in neutral current transformer 42 to constitute two units for flow through closed secondary circuit breaker auxiliary contacts 20b and differential current transformer primary winding 40b. The current balance of differential current transformer 40 is thus achieved and an improper ground fault trip function cannot be initiated. The two units of secondary current flowing from primary winding 40b into junction 42b split, with one unit flowing back through neutral current transformer 42 and the other unit flowing over lead 54 and into neutral current transformer 34.

In the event of a ground fault, such as indicated at 64 in FIG. 3, any ground fault current returning to source 12 via the neutral buses of the network will create a secondary current which simply circulates in the loop circuit in the same manner as described in connection with FIG. 2. Thus none of this secondary current can flow through differential current transformer primary winding 40b to mitigate the imbalance created by the secondary current induced in phase current transformer 38 and flowing through differential current transformer primary winding 40a.

Figure 4:
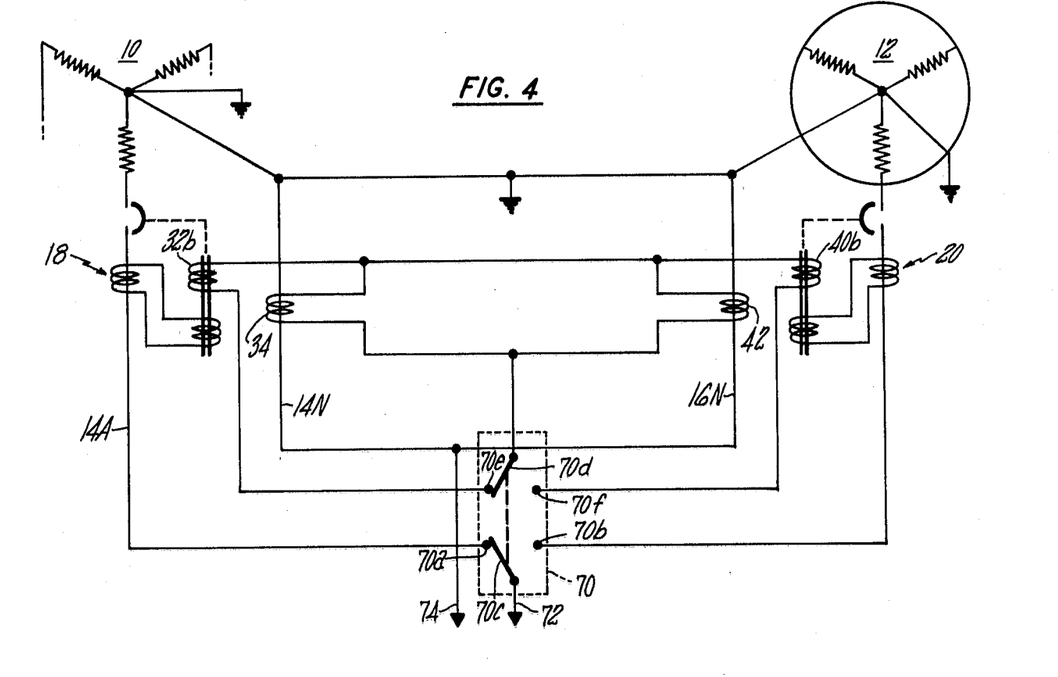
FIG. 4 is a simplified circuit diagram of still another embodiment of the invention adapted to protect a double-ended load transfer power distribution network against ground faults.

In FIG. 4, the invention is shown adapted to a double-ended power distribution network wherein a single load is fed from either a normal source 10 or a standby source 12 in accordance with the position of a transfer switch 70. Phase bus 14A fed from source 10 through main breaker 18 is brought out to fixed contact 70a of transfer switch 70. Main bus 16a fed from standby source 12 through main breaker 20 is brought out to fixed contact 70b of the transfer switch. It is understood that the remaining phases of the two sources are separately brought out, through the main breakers and main buses to additional fixed transfer switch contacts. Transfer switch movable contact 70c is positioned to engage either of its fixed contacts 70a and 70b pursuant to routing phase current from either source 10 and 12 to a common phase bus 72. Neutral buses 14N and 16N are brought out in common to an unswitched common phase bus 74. Since in this type of installation, the main breakers are typically both closed, the function of breaker auxiliary contacts 18b and 20b in the embodiments of FIGS. 1 through 3 are served by a second section of transfer switch 70. Specifically, the lower sides of neutral current transformers 34 and 42 are brought out in common to movable contact 70d which is ganged with movable contact 70c. The lower side of differential current transformer primary winding 32b is brought out to stationary contact 70e, while the lower side of differential current transformer primary winding 40b is brought out to stationary contact 70f of transfer switch 70. The upper sides of the neutral current transformers are connected together to complete their circuit loop, as in the previously considered embodiments. It is seen that with the transfer switch in its position shown in FIG. 4, neutral current transformer 34 is connected in circuit with its primary differential current transformer winding 32b, while neutral current transformer 42 is disconnected from its differential current transformer primary winding 40b.

Assuming the transfer switch to be in its position in FIG. 4, it will be seen that neutral current returning to source 10 via neutral bus 16N under normal neutral loading conditions will induce a secondary current in neutral transformer 42 which will combine with any secondary current induced in neutral transformer 34 occasioned by any neutral current returning to source 10 via neutral bus 14N for flow through the transfer switch and differential current transformer primary winding 32b pursuant to balancing differential current transformer winding 32. On the other hand, any ground fault current returning to source 10 via neutral buses 16N and 14N will induce secondary currents in neutral current transformers 34, 42 which simply circulates in their loop rather than flowing through primary winding 32b. Thus, the differential current transformer 32 is unbalanced to the full extent of the ground fault current, and a ground fault function is initiated to trip main breaker 18.

It will be observed that the main breakers may be equipped with an automatic throw-over mechanism, wherein the closure of one of the main circuit breakers opens the other main breaker. In this situation, transfer switch 70 can be eliminated, and the appropriate connections and disconnections of the neutral current transformers with their associated differential current transformer primary windings can be effected by the normally open circuit breaker auxiliary contacts utilized in the embodiments of FIGS. 1 through 3.

Figure 5:
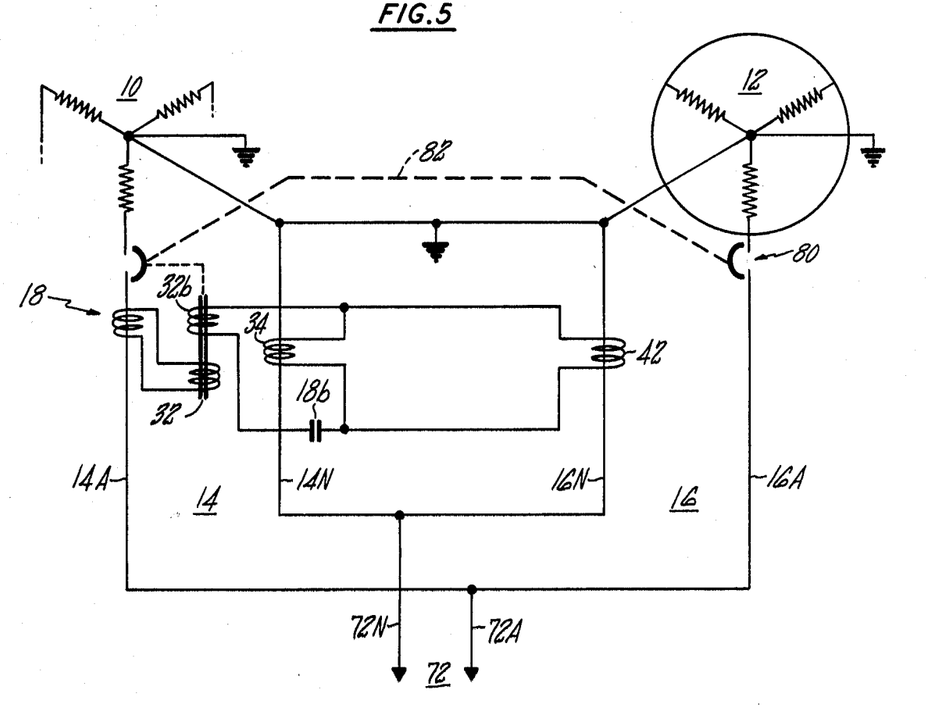
FIG. 5 is a circuit diagram of a simplified ground fault protection system adapted as an alternative to the embodiment of FIG. 4 for the protection of a double-ended, load transfer power distribution network.

If integral ground fault protection for the network of FIG. 4 is not required when standby source 12 is powering the load, the ground fault protection system is constructed in the manner shown in FIG. 5. Normal source 10 supplies power to bus 14 through integral ground fault circuit breaker 18, while standby source applies its power to bus 16 through a non-ground fault circuit breaker 80. Main buses 14 and 16 are connected together and brought out on common bus 72. The circuit breakers are interconnected by a throw-over mechanism, symbolically indicated at 82, such that when one of the breakers is closed, the other is necessarily open. Connected in loop circuit with neutral current transformer 34 is neutral current transformer 42 inductively coupled with neutral bus 16N.

Under normal neutral loading situations, while source 10 is feeding a load, any neutral current returning indirectly to the source via bus 16N induces a secondary current in neutral current transformer 42 which supplements the secondary current induced in current transformer 34 by any neutral current returning directly via neutral bus 14N, with the resultant secondary current flowing through differential current transformer primary winding 32b to maintain its balance. On the other hand, as in the previously described embodiments, any ground fault current returning to source 10 via neutral buses 16N, 14N and ground bus 24 induces secondary currents which do not flow into the differential current transformer primary winding 32b, but simply circulate in the neutral current transformer secondary winding loop circuit. As a consequence, differential current transformer 32 is unbalanced to the full extent of the ground fault current, and the appropriate response to the ground fault is undertaken by circuit breaker 18.

If desired the circuit breaker throw-over mechanism 82 in FIG. 5 can be replaced by a transfer switch, such as disclosed in FIG. 4, for switching the common phase bus 72A between main phase bus 14A and 16A.

Figure 6:
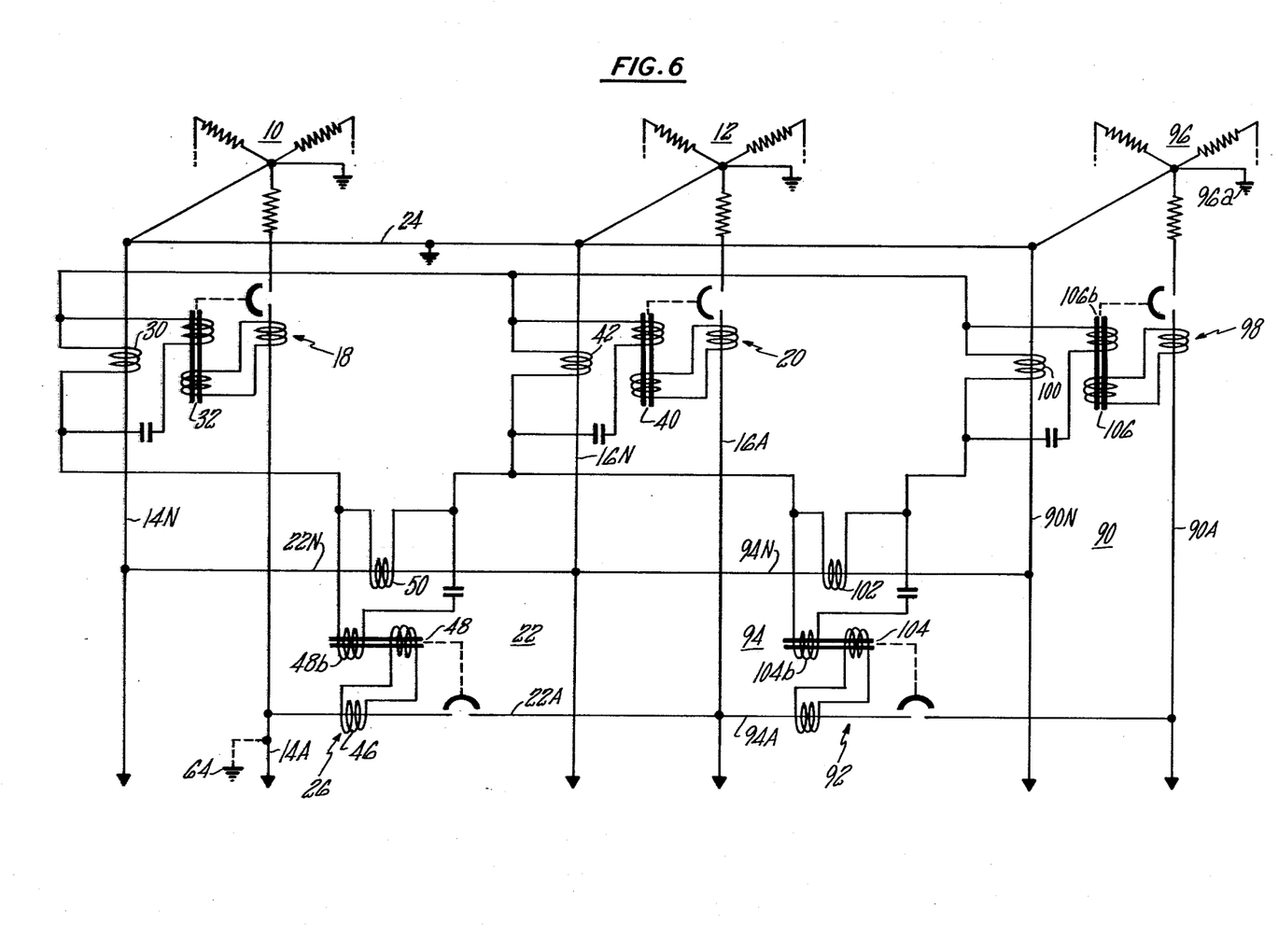
FIG. 6 is a simplified circuit diagram of still another embodiment of the invention adapted to protect a triple-ended power distribution network against ground faults.

Up to this point, the present invention has been considered in its adaptation to a double-ended power distribution network. However, it is also applicable to a distribution network comprised of more than two sources. For example, as seen in FIG. 6, the ground fault protection system of the invention is applied to a distribution network consisting of three sources. This system is the same as that of FIGS. 1 and 2, except that an additional main bus 90 is connectable via an additional tie ground fault circuit breaker 92 and an additional tie bus 94 to tie bus 22 and main bus 16, as well as main bus 14 if tie circuit breaker 26 is closed. Additional main bus 90 is connectable to a third source 96 via an additional main ground fault circuit breaker 98. All of the main and tie circuit breakers seen in FIG. 5 are identically constructed. Neutral current transformers 100 and 102 of circuit breakers 98 and 92, respectively, are connected in series across neutral current transformer 42 to create what may be thought of as a second secondary current loop circuit. As will be seen, the expanded ground fault protection system of FIG. 6 is operative with any three of the five ground fault circuit breakers closed and the remaining two open. Thus, for example, assume that main circuit breakers 18 and 20 are open, and circuit breaker 98 is closed to route three units of phase current from source 96 via main bus 90, tie bus 94, tie breaker 92, tie bus 22, and tie breaker 26 to a phase-to-neutral load (not shown) connected with main bus 14. It will be further assumed that the three units of neutral current in returning to source 96, split up in the following manner. One unit of neutral current returns via neutral bus 14N and ground bus 24, one unit of neutral current returns via tie neutral bus 22N, main neutral bus 16N and ground bus 24, while the third unit of neutral current returns to source 96 via tie neutral buses 22N and 94N, and main neutral bus 90N. With this neutral loading condition, it will be seen that the one unit of secondary current induced in neutral current transformer 30 combines with the two units of secondary current induced in neutral current transformer 50 to produce three units of secondary current for driving differential current transformer winding 48b of differential current transformer 48 in tie circuit breaker 26. This transformer is thus balanced out and no ground fault trip function is initiated. Of the three units of secondary current flowing out of primary winding 48b, two units flow back through neutral current transformer 50, while one unit combines with the unit of secondary current induced in neutral current transformer 42 to provide two units flowing in the direction of neutral current transformer 102. These two units combine with the one unit of secondary current induced in this neutral current transformer to produce three units which flow through primary winding 104b of differential current transformer 104 in tie breaker 92. This differential transformer is thus balanced and no ground fault trip function is initiated in tie breaker 92. Of the three units of secondary current flowing out of differential current transformer primary winding 104b, one unit flows back through neutral current transformer 102, while the remaining two flow up toward neutral current transformer 100. These two units combine with the one unit of secondary current induced in neutral current transformer 100 to make three units which are constrained to flow through primary winding 106b of differential current transformer 106 in main breaker 98. This differential transformer is then balanced to inhibit the initiation of a ground fault trip function in this breaker. Of the three units of secondary current flowing out of primary winding 106a, one unit flows back through neutral current transformer 100, while the remaining two flow back around toward neutral current transformers 30 and 42. One of these secondary current units flows through neutral current transformer 42 to make up the current unit induced therein, while the last unit flows through neutral current transformer 30 to make up the secondary current unit induced therein.

To demonstrate that the ground fault protection system of FIG. 6 properly responds to a ground fault condition, assume that source 96 is feeding three units of phase current via bus 90, tie bus 94 and tie bus 92 to a ground fault 64 on phase bus 14A of main bus 14. It will be assumed that of the three units of current feeding this ground fault, one unit returns to source 96 via its neutral point ground connection 96a, one unit returns via ground bus 24, main neutral bus 14N, tie neutral bus 22N, tie neutral bus 94N and main neutral bus 90N, and the final current unit returns to source 96 via ground bus 24, main neutral bus 16N, tie neutral bus 94N and main neutral bus 90N. It is seen that the unit of secondary current induced in neutral current transformer 50 is constrained to flow through neutral current transformer 30 to make up the unit of secondary current induced therein, leaving no current available to flow through primary winding 48b of differential current transformer 48 in tie breaker 22. Thus, the imbalance created by the three units of secondary current induced in phase current transformer 46 and flowing through differential current transformer primary winding 48a remains unmitigated, and this differential current transformer senses the full extent of the ground fault current. The unit of secondary current flowing upwardly out of neutral current transformer 30 combines with the unit of secondary current induced in neutral current transformer 42 to produce two units of secondary current flowing into the upper terminal of neutral current transformer 100. These two units of secondary current make up the two units induced in neutral current transformer 100, leaving no current available for flow through primary winding 106b of differential transformer 106 in main circuit breaker 98. Consequently, this differential current transformer remains imbalanced to the full extent of the ground fault current. The two units of secondary current flowing downwardly out of neutral current transformer 100 make up the two units of secondary current induced in neutral current transformer 102 of tie breaker 92. Consequently, there is no current available for flow through primary winding 104b of differential current transformer 104 and tie circuit breaker 92, and this differential current transformer likewise senses the full extent of the ground fault current. The two units of secondary current flowing out of neutral current transformer 102 flow back around toward neutral current transformers 42 and 50, making up the single units of secondary current induced therein.

It is thus seen that, as in the previously described embodiments of the invention, the ground fault protection system of FIG. 6, by virtue of the illustrated interconnections of the five neutral current transformers in circuit loops, correctly accounts for the currents flowing in the various neutral bus under normal neutral loading conditions as well as ground fault conditions, such that the circuit breakers initiate ground fault trip functions only in response to true ground fault conditions. It will be appreciated from FIG. 6, that the ground fault protection system can be expanded so as to accommodate a distribution network having any number of sources feeding associated main bus through main ground fault circuit breakers, with the main bus connectable in common via tie bus and tie circuit breakers.

It will be appreciated that the present invention is adaptable to many multi-source distribution network configurations other than those specifically illustrated herein. Basically, the invention is applicable to multi-source distribution networks having one or more grounding points, and the network configuration is such that neutral currents can flow over ground circuit paths in returning to a source feeding a load, and/or ground fault currents can flow over network neutral bus in returning to a source feeding a ground fault. In the latter situation, the teaching of the present invention may be applied to afford ground fault network protection in the situation wherein the neutral point of a source feeding a ground fault is not directly grounded, but is connected to ground over network neutral bus to the solidly grounded neutral point of another source. It will be appreciated that ground bus 24 shown interconnecting the main neutral buses may, in practice, be constituted by separate ground buses individually connected to each main neutral bus and interconnected by an extraneous ground circuit path. Moreover, the instant ground fault protection system is readily applicable to distribution networks having any number of phases, including a single phase network.

The present invention has been disclosed using differential current transformers as the current differential or residual circuit means for sensing the magnitudes of ground fault currents, as in the manner disclosed in the previously mentioned U.S. Pat. No. 3,786,311. It will be appreciated, however, that other forms of current differential circuit means are contemplated for operating to resolve the instantaneous vectorial summation of the current flowing in the phase and neutral conductors at a particular location in a distribution network in order to find any current imbalance indicative of ground fault current. Thus, for example, the present invention is equally applicable to integrally equipped ground fault circuit breakers utilizing, rather than a differential current transformer, a current differential circuit wherein the phase and neutral current sensing transformers are interconnected via a diode rectifying network in a manner to resolve vectorial sum of the phase and neutral currents. A current differential circuit of this type is exemplified in the disclosure of the previously mentioned co-pending application Ser. No. 794,700. Moreover, the phase and neutral current sensing transformers may simply be mutually interconnected in residual circuit relation pursuant to resolving any imbalance in the network currents, such as disclosed in U.S. Pat. No. 3,660,722.

While the present invention has been described using integrally equipped, static trip ground fault circuit breakers, it will be understood that switches having electric tripping capabilities which may be initiated from current differential circuit means may also be used as the main and tie circuit interrupting components.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A ground fault protection system for an electrical power distribution network including at least first and second sources, at least one having its neutral point solidly connected to ground, each source capable of feeding a common load via associated first and second main buses each including at least one phase bus conductor and a neutral bus conductor, the neutral bus conductor of each main bus being connected to the neutral point of its associated source and connected in common downstream from the sources, said system comprising, in combination:
   A. a first main circuit interrupter including
      (1) main contacts connecting the first source to the first main bus,
      (2) a separate phase current transformer coupled with each phase bus conductor of the first main bus, each said phase current transformer having a secondary winding in which is developed a current signal proportional to the current flowing in the coupled phase bus conductor,
      (3) a first neutral current transformer coupled with the neutral bus conductor of the first main bus, said neutral current transformer having a secondary winding in which is developed a current signal proportional to the current flowing in the neutral bus conductor of the first main bus, and
      (4) current differential circuit means including said secondary windings of said phase and neutral current transformers and operating to develop a ground fault signal for tripping said first main circuit interrupter in response to an imbalance in said secondary winding current signals;
   B. first switching means including contacts operating to connect said first neutral current transformer secondary winding to said differential circuit means while current is being supplied to the load via the first main bus and to disconnect said first neutral current transformer secondary winding from said differential circuit means while current is being supplied to the load via said second main bus;
   C. a second neutral current transformer coupled with the neutral bus conductor of the second main bus and having a secondary winding in which is developed a current signal proportional to the current flowing in the neutral bus conductor of the second main bus; and
   D. means connecting said first and second neutral current transformer secondary windings in a circuit loop;
   E. whereby, under normal neutral loading conditions, any neutral current returning to the first source through the common neutral bus connection and the neutral bus conductor of the second main bus induces via said second neutral current transformer secondary winding a current in said circuit loop which circulates through said differential circuit means to maintain an overall current signal balance therein, and, under ground fault conditions, any ground fault current returning to the first source through the neutral bus conductors of the main buses and the common neutral bus connection induces via said first and second neutral current transformer secondary windings a current which circulates in said circuit loop exclusive of said differential circuit means to insure an overall current signal imbalance therein indicative of the ground fault current magnitude.

2. The ground fault protection system defined in claim 1, which further includes
   A. a second main circuit interrupter having main contacts connecting the second source to the second main bus; and
   B. a throw-over mechanism interconnecting said first and second main interrupters and operating to insure that the main contacts of only one of said first and second main interrupters can be closed at any time.

3. The ground fault protection system defined in claim 1, which further includes a load transfer switch operating to connect either one or the other of the first and second main buses to supply current to the common load, said transfer switch being operatively coupled to said first switching means to condition said contacts thereof accordingly.

4. The ground fault protection system defined in claim 1, wherein said first switching means is conditioned by said first circuit interrupter such that said contacts thereof are closed while said main contacts are closed and open while said main contacts are open, said system further including:
   A. a second main circuit interrupter including
      (1) main contacts connecting the second source to the second main bus,
      (2) a separate phase current transformer coupled with each phase conductor of the second main bus, each said phase current transformer having a secondary winding in which is developed a current signal proportional to the current flowing in the coupled phase bus conductor, and
      (3) current differential circuit means including said second neutral current transformer secondary winding and each said phase current transformer secondary winding of said second main circuit interrupter and operating to develop a ground fault signal for tripping said second circuit interrupter in response to an imbalance in said secondary winding current signals; and
   B. second switching means including contacts conditioned by said second circuit interrupter to connect said second neutral current transformer secondary winding to its associated differential circuit means while said second interrupter main contacts are closed and to disconnect said second neutral current transformer secondary winding therefrom while said second interrupter main contacts are open.

5. The ground fault protection system defined in claim 4, which further includes a load transfer switch operating to connect either one or the other of the first and second main buses to the load, said first and second switching means being ganged to said load transfer switch and operating to connect the neutral current transformer secondary winding to the differential circuit means of the main circuit interrupter associated with the main bus connected to the load by said transfer switch.

6. The ground fault protection system defined in claim 4, wherein each said current differential circuit means is in the form of a differential current transformer.

7. A ground fault protection system for an electrical power distribution network including at least first and second polyphase sources with the neutral point of at least one source solidly connected to ground, the source neutral points being interconnected by a ground circuit path, each source capable of feeding associated first and second polyphase main buses interconnected by a polyphase tie bus, and each main bus including a neutral bus conductor connected to the neutral point of its associated source and connected together by a neutral bus conductor included in the tie bus, said system comprising, in combination:

A. first and second main circuit interrupters, each including
  (1) main contacts respectively connecting the first and second sources to the first and second main buses,
  (2) a separate phase current transformer coupled with each phase bus conductor of the first and second main buses, each phase current transformer having a secondary winding in which is developed a current signal proportional to the current flowing in the coupled phase bus conductor,
  (3) first and second neutral current transformers respectively coupled with the neutral bus conductors of the first and second main buses, each said neutral current transformer having a secondary winding in which is developed a current signal proportional to the current flowing in the coupled neutral bus conductor, and
  (4) current differential circuit means including said secondary windings of the associated phase and neutral current transformers and operating to develop a ground fault signal for tripping the associated main circuit interrupter in response to an imbalance in the secondary winding current signals received thereby, and
  (5) auxiliary contacts operating to connect the first and second neutral current transformer secondary windings into their associated differential circuit means only while the main contacts of the associated main circuit interrupter are closed;

B. a tie circuit interrupter including main contacts operating in the tie bus and a third neutral current transformer coupled with the neutral bus conductor of the tie bus and having a secondary winding in which is developed a current signal proportional to the current flowing in the tie neutral bus conductor; and C. means connecting said first, second and third neutral current transformer secondary windings in a first circuit loop;

D. whereby, with the main contacts of any two of the first main, second main and tie circuit interrupters closed and one of said main contacts of the above circuit interrupters being open,
  (1) under normal neutral loading conditions, neutral current returning to one of the sources through the tie neutral bus conductor and the neutral bus conductor of the main bus associated with the other source induces, via the associated neutral current transformers, a current in said circuit loop which circulates through appropriate current differential circuit means such as to maintain overall current signal balances therein, and
  (2) under ground fault conditions, any ground fault current returning to the one of the sources feeding the fault through the neutral bus conductors of the main and tie buses induces, via said neutral current transformers, a current which circulates in said circuit loop exclusive of said current differential circuit means to insure overall current signal imbalances therein indicative of the ground fault current magnitude.

8. The ground fault protection system defined in claim 7, wherein said first and second main circuit interrupters each further include an additional set of auxiliary contacts which are closed when their associated main contacts are open and open when their associated main contacts are closed, said additional auxiliary contacts operating in said circuit loop when the main contacts of the main interrupters are open to impose a shunt around said third neutral current transformer secondary winding.

9. The ground fault protection system defined in claim 7, wherein said tie circuit interrupter further includes
  (1) a separate phase current transformer coupled with each phase bus conductor of the tie bus, each phase current transformer having a secondary winding in which is developed a current signal proportional to the current flowing in the tie phase bus conductor,
  (2) current differential circuit means including said third neutral current transformer secondary winding and each phase current transformer secondary winding associated with the tie phase bus conductors and operating to develop a ground fault signal for tripping said tie circuit interrupter in response to a current signal imbalance therein, and
  (3) auxiliary contacts operating to connect said third neutral current transformer secondary winding into said tie interrupter differential circuit means only while said main contacts of said tie circuit interrupter are closed.

10. The ground fault protection system defined in claim 7, wherein each said current differential circuit means is in the form of a differential current transformer.

11. The ground fault protection system defined in claim 9, wherein the distribution network further includes a third polyphase source having its neutral point solidly connected to ground, and interconnected to the neutral points of the first and second sources by a ground circuit path, said third source capable of feeding a third polyphase main bus interconnected with the second main bus by an additional polyphase tie bus, said third main bus including a neutral bus conductor connected to the neutral point of the third source and connected to the neutral bus conductor of the second main bus by a neutral bus conductor included in the additional tie bus; the system further including
  A. a third main circuit interrupter including
    (1) main contacts connecting the third source to the third main bus,
    (2) a separate phase current transformer coupled with each phase bus conductor of said third main bus, each said phase current transformer having a secondary winding in which is developed a current signal proportional to the current flowing in the coupled bus conductor,
    (3) a fourth neutral current transformer coupled with the neutral bus conductor of the third main bus and having a secondary winding in which is developed a current signal proportional to the current flowing in the third main bus neutral bus conductor, (4) current differential circuit means including said fourth neutral secondary winding and each phase current transformer secondary winding associated with third main bus and operating to develop a ground fault signal for tripping said third main interrupter in response to a current signal imbalance therein, and (5) auxiliary contacts operating to connect said fourth neutral current transformer secondary winding into said third main interrupter differential circuit means only while said main contacts of said third main interrupter are closed; and B. an additional tie circuit interrupter including (1) main contacts operating in the additional tie bus, (2) a separate phase current transformer coupled with each phase bus conductor of the additional tie bus, each phase current transformer having a secondary winding in which is developed a current signal proportional to the current flowing in the coupled phase bus conductor, (3) a fifth neutral current transformer coupled with the neutral bus conductor of the additional tie bus and having a secondary winding in which is developed a current signal proportional to the current flowing in the additional tie bus neutral bus conductor, (4) current differential circuit means including said fifth neutral current transformer secondary winding and the secondary winding of each said additional tie bus phase current transformer secondary winding and operating to develop a ground fault signal for tripping said additional tie interrupter in response to a current signal imbalance therein, and (5) auxiliary contacts operating to connect said fifth neutral current transformer secondary winding into said differential circuit means of said additional tie interrupter only while said main contacts of said additional tie interrupter are closed; and C. means connecting said second, fourth and fifth neutral current transformer secondary windings in a second circuit loop, said second neutral current transformer secondary winding being common to both said first and second circuit loops, D. whereby, with the main contacts of any three of the five main and tie interrupters closed, said ground fault protection system properly responds to normal neutral loading and ground fault conditions.

* * * * *